Patented Oct. 10, 1939

2,176,028

UNITED STATES PATENT OFFICE 2,176,028

STABILIZATION OF MEAT AND FISHERY PRODUCTS

Sidney Musher, New York, N. Y., assignor to Musher Foundation Incorporated, New York, N. Y., a corporation of New York No Drawing. Application September 10, 1938, Serial No. 229,296

7 Claims. (Cl. 99—157)

The present invention relates to the stabilization of fishery and meat products subject to protein and fat decomposition, and it particularly relates to the stabilization of such products by treating them with the dilute unconcentrated water soluble extracts of cereals and grains.

It has been found that fats may be treated by adding thereto oil soluble antioxidant materials such as the crude vegetable oils, lecithin, etc. Fats may also be treated with the substantially oily seed materials, such as crushed sesame seed, crushed peanuts, etc., wherein free oil is released following the macerating or grinding process.

In connection with fishery and meat products that are subjected to an aqueous brining, curing or washing treatment, or where aqueous materials are added thereto, the use of the oily materials described above is limited by reason of their immiscibility with water or aqueous materials, and also by reason of the fact that the meat and fishery products cannot be treated with the substantially oily or oil materials and subsequently washed to remove such added materials because of the adhering nature of the oily substances to the products mentioned.

The retardation of both protein and fat decomposition of fishery and meat products is of tremendous importance to those industries, particularly if this can be accomplished with marked margins of improvement and without changing the normal appearance, flavor, etc., of the treated product. These products present a distinct problem because of the combined putrefaction and rancidity types of decomposition to which they are subject.

It is among the objects of the present invention to provide improved stabilized fishery and meat products, substantially unchanged in appearance the stability of which products will not be decreased by processing at elevated temperatures, and which stabilizers can be readily removed following the treatment of the fishery or meat product.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accomplishing the above objects, it has been found most satisfactory to treat fishery and meat products with the dilute aqueous unconcentrated water soluble extract of cereals and grains, such as corn, barley, oats, hominy, tapioca, rye, rice, wheat, buckwheat, etc., preferably in ground or flour condition.

The extract derived from oats and maize, in raw and unbleached condition, gives the highest yield of stabilizing activity and is far most desirable. The cereals produce the most acceptable extract because of their low oil content which seems to enhance the activity of the extract as contrasted to high oil containing materials in which the antioxidants are not readily susceptible to water extraction.

Particularly in the fatty fishery products such as salmon, herring, mackerel, pilchards, etc., the fat therein appears to be stabilized or surrounded by protein films which extend through the entire mass. The decomposition of the water soluble protein phase seems to accelerate the decomposition of the oils or fats which may also be present.

The dilute unconcentrated water soluble extract of the cereals and grains is markedly effective in reducing the protein decomposition and surprisingly gives protection to the fat globules as well. Even when used in such small amounts as to merely stabilize the proteins, the extract gives stability to the non aqueous, disperse or fatty phase.

This extract is generally prepared by mixing a cereal, preferably in divided form, with water or a water soluble solvent such as brine or other aqueous curing medium, mixing thoroughly in order to remove all the water soluble material, and then removing substantially all the fibrous or solid material by decanting, centrifuging, filtration, or other means.

With one pound of cereal, there may be used one or more gallons of water, for example. Generally, one pound of cereal may be admixed with 2½ gallons of water to obtain an effective stabilizing medium, which may be further diluted if desired.

The extract so obtained has been found to be a far more effective stabilizer for fishery and meat products than the original cereal not extracted, in spite of the fact that the residue following extraction still retains some inhibiting properties. Not only is the extract efficient at the beginning of the period of decomposition, but it retains its effectiveness over a long period of time and where other stabilizers would fail.

This extract also has the advantage of not changing the normal color, flavor or appearance of the treated fishery or meat product as is observed when the cereal itself is employed.

It is desirable not to resort to concentration of the water soluble extract, once obtained, as by evaporation or drying, for by doing so a loss in protective action is observed. The extract should therefore be retained in its original form after extraction but may be further diluted as desired.

In the frozen fish or meat industry, the extract may be employed as the medium in which the fish or meat is dipped prior to freezing or at the time of glazing.

Example I

Mackerel fillets were dipped before freezing into—
A. 20° brine for 20 seconds.
B. 20° brine containing 5% fine oat flour against the weight of the brine holding the oat flour solids in suspension.
C. 20° brine containing the water extract of 5% fine oat flour.

Taste tests were made after broiling at the close of a 3 month and 6 month storage period at 15° F., with the following results:

| | After 3 months | After 6 months |
|---|---|---|
| Fillets A | Fishy | Rancid, partly putrid. |
| Fillets B | Floury, not fishy | Rancid. |
| Fillets C | Good | Slightly fishy, otherwise good. |

If desired, the amount of oat flour used to produce the extract may be reduced to 0.5% or the extract of 5% of oat flour may be diluted and a significant improvement would still have been observed.

In the case of salt or cured fishery and meat products such as salt mackerel, smoked herring, cured bacon, etc., the product may be held for a first curing period of up to 10 days in a brine or curing mixture containing the water extract and then completely repacked washing off or otherwise removing all the stabilizing extracted materials, and the protective effects will nevertheless be retained over the entire storage period, or repacking need not be resorted to and the efficiency of the extract will in full be retained to a far greater degree than if the unextracted cereal had been employed.

Example II

Gutted herring having a fat content of 12% was salted in a concentrated brine at room temperature, additional salt being added at regular intervals to maintain the salt concentration, the old brine being replaced with fresh untreated brine after 25 days.

| | Comments— | |
|---|---|---|
| | At end of 1 month | At end of 3 months |
| Herring packed in brine only. | Fishy | Rancid and putrid showing definite protein decomposition, inedible. |
| Herring packed in brine containing 10 percent of ground oats against the weight of the salt. | Slightly sour, no fishiness, cereal odor. | Slightly sour, fishy and rancid. |
| Herring packed in brine containing the water extract (later made into the brine) of 10 percent of ground oats against the weight of the salt. | Good | Slightly fishy, far better in odor, and appearance than either of above. |

A distinct advantage in this treatment is that there is no substantial change in the color, odor or other appearance of the treated material as is observed when the whole cereal is employed with its full starch content and where the fibre surplus would appear on the surface of the treated fish or meat product.

In addition, in connection with fishery products particularly subject to both protein and rancidity decomposition, the use of the cereal flours themselves in the brining thereof sometimes develops sour cereal odors which are very objectionable. When the water soluble extract as described is employed, however, no such off odors develop. This is in addition to the much greater degree of protection obtained by the use of the extract than by the use of the original cereal.

Where desired, the water extract may be utilized for manufacture into ice and used in connection with the icing of fishery products of all kinds, whether on the boats immediately after catching or during normal distribution or in connection with the icing of meats including sausage, etc., whether the ice is used in conjunction with brine or without.

Cured meat products such as bacon, salt pork, sausage, etc., may similarly be treated using the unconcentrated water extract of cereals in a similar manner to that described for fishery products. It is desirable in the case of meat products to use a larger quantity of cereal than for fishery products and as much as 20% of cereal to 80% of water may be utilized for the production of the water extract for use with meat products.

Mackerel may be iced with ice made from the water extract of oats, using from 0.2% to 5.0% of the cereal product against the weight of the water and producing the water extract for manufacture into ice in the usual way. As the ice melts gradually and releases the protective materials to the fish, a distinct improvement in keeping quality is observed. As exemplary of the ice in this manner, note the following experiment:

Example III

1% of maize flour was mixed with water, the fibrous portion removed by filtration, and the water portion made into ice. This was compared with ice made from the untreated water in an experiment in which whole round mackerel was iced for 12 hours with each of the treated and untreated ice, the ice being allowed to melt gradually, and then replaced with untreated ice in each case and tested after 96 hours with the following results:

| | Peroxide value | Comments |
|---|---|---|
| Iced with plain ice | 60 | Putrid and rancid. |
| Iced with treated ice | 35 | Much better than control, slightly fishy. |

Ice treated in the manner described above may also be used for direct addition to meat products, such as to sausage where ordinary ice is normally employed in the manufacture thereof.

Example IV

Fully seasoned sausage was made by the following methods:
A. Using ice as usual.
B. Using ice made from the water extract of 1% of pulverized oat flour, free of fibrous matter.

C. Using 1% of pulverized oat flour incorporated in the sausage, untreated ice being added as in the control sample.

The sausage was then placed in cold storage at 20° F. wrapped in moistureproof papers with the following results:

|  | Comments after— | | |
| --- | --- | --- | --- |
|  | 30 days | 60 days | 90 days |
| Sample A | Slightly rancid | Rancid | Very rancid. |
| Sample B | O. K | O. K | Slightly rancid. |
| Sample C | O. K | Slightly rancid | Rancid. |

The material of the present invention differs remarkably from other oil soluble antioxidant materials, such as for example, lecithin, in that it contains a quantity of carbohydrate material, is not deactivated at elevated temperatures, but even becomes more active when the product with which it is treated is subjected to elevated temperatures, and in addition, the extent described herein has more continued potency and activity for longer periods of time.

In those cases where the fishery or meat products are subjected to a subsequent drying or dehydration process as in the case of fish meal, the unconcentrated water extract should preferably be added prior to dehydration in order to retard the decomposition normally occurring during the dehydration and to be diffused better through the body of the product.

Although by reason of their greater efficiency and potency, the unconcentrated water soluble extract of the cereals should be used, where desired for purposes of shipment of the extract in least bulk form, the water material used as a solvent may be removed by evaporation at atmospheric pressure or preferably under vacuum and a concentrated material may subsequently be used after dilution. The evaporating or drying process tends to reduce the stabilizing action of the extract. The concentrated extract after removal of the solvent will char when heated to temperatures in excess of 250° F., but this will in no way affect its stabilizing properties, but on the other hand, will tend to increase its potency as a stabilizer.

Since alcohol is similar as a solvent to water in many respects, it may also be employed to extract the stabilizers, the protective properties of which will not be reduced at elevated temperatures and which stabilizers will in a large measure be water soluble. Although the alcohol soluble type of extract may be employed under this invention, it is particularly desired to use the unconcentrated water soluble extract first described. The alcohols may be ethyl, propyl, etc., and less desirably methyl, glycols, glycerol, sugar solutions, etc.

The present application is a continuation in part of applications, Serial No. 34,293, filed August 1, 1935, and Serial No. 61,087, filed January 27, 1936.

The copending application, Serial No. 249,990 filed January 9, 1939 is specifically directed to stabilizing aqueous food materials with a water soluble extract of a finely divided unbleached cereal. Application, Serial No. 229,664 filed September 13, 1938, is more broadly directed to stabilizing food compositions whether aqueous or non-aqueous with either the alcohol or water soluble extracts of the finely divided unbleached cereals. The present application is more specifically directed to the use of the water and alcohol soluble extracts of the cereals for stabilizing meat and fishery products.

Having described my invention, what I claim is:

1. The method of stabilizing meat and fishery products to render said products resistant to oxidative deterioration which comprises treating them with a small amount of an extract of a finely divided unbleached cereal, said extract being soluble in a solvent selected from the group consisting of water and alcohol.

2. The method of stabilizing meat and fishery products to render said products resistant to oxidative deterioration which comprises treating them with a small amount of a water soluble extract of a finely divided unbleached cereal.

3. The method of stabilizing meat and fishery products to render said products resistant to oxidative deterioration which comprises treating them with a small amount of an extract of a finely divided unbleached cereal selected from the group consisting of oats and maize, said extract being soluble in a solvent selected from the group consisting of water and alcohol.

4. The method of stabilizing fatty fish to render said fish resistant to oxidative deterioration, which comprises treating them with a small amount of a water soluble extract of a finely divided unbleached cereal.

5. The method of stabilizing mackerel to render said mackerel resistant to oxidative deterioration, which comprises treating the mackerel with a small amount of a water soluble extract of a finely divided unbleached cereal.

6. The method of stabilizing bacon to render said bacon resistant to oxidative deterioration, which comprises treating the bacon with a small amount of a water soluble extract of a finely divided unbleached cereal.

7. A process of improving meat and fishery products to render them resistant to oxidative deterioration which comprises preparing an unconcentrated aqueous extract of an unbleached cereal flour and then placing the meat and fishery products in said aqueous extract until said products have been thoroughly treated therewith.

SIDNEY MUSHER.